(12) United States Patent
Driscoll et al.

(10) Patent No.: US 7,685,809 B2
(45) Date of Patent: Mar. 30, 2010

(54) ON-BOARD AMMONIA GENERATION AND EXHAUST AFTER TREATMENT SYSTEM USING SAME

(75) Inventors: Josh Driscoll, Dunlap, IL (US); Wade J. Robel, Peoria, IL (US); Cory A. Brown, Pekin, IL (US); Roger L. Urven, Jr., Colona, IL (US)

(73) Assignee: Caterpillar Inc., Peoria, IL (US)

( * ) Notice: Subject to any disclaimer, the term of this patent is extended or adjusted under 35 U.S.C. 154(b) by 1179 days.

(21) Appl. No.: 11/242,172

(22) Filed: Oct. 3, 2005

(65) Prior Publication Data
US 2007/0092426 A1    Apr. 26, 2007

(51) Int. Cl.
*F01N 3/10* (2006.01)
*C01C 1/02* (2006.01)
(52) U.S. Cl. .............................. 60/274; 60/301; 423/352
(58) Field of Classification Search ............. 60/299, 60/300, 301, 302, 274; 423/352
See application file for complete search history.

(56) References Cited

U.S. PATENT DOCUMENTS

| 6,047,542 | A | 4/2000 | Kinugasa et al. | |
|---|---|---|---|---|
| 6,843,055 | B2 | 1/2005 | Ootake | |
| 7,402,292 | B2 * | 7/2008 | Hemingway et al. | 423/239.1 |
| 2003/0213234 | A1 * | 11/2003 | Funk et al. | 60/286 |
| 2004/0144083 | A1 * | 7/2004 | Ament | 60/286 |
| 2006/0037309 | A1 * | 2/2006 | Funk et al. | 60/286 |
| 2006/0096275 | A1 * | 5/2006 | Robel et al. | 60/286 |
| 2006/0201139 | A1 * | 9/2006 | Khadiya | 60/286 |
| 2006/0288691 | A1 * | 12/2006 | Coleman et al. | 60/286 |
| 2007/0068142 | A1 * | 3/2007 | Robel et al. | 60/285 |
| 2007/0227143 | A1 * | 10/2007 | Robel et al. | 60/605.1 |

OTHER PUBLICATIONS

Ogunwumi, Fox, Patil and He; In-Situ $NH_3$ Generation For SCR $NO_x$ Applications, SAE 2002-01-2872; Oct. 2002; pp. 1-6; SAE International; San Diego, California.

* cited by examiner

*Primary Examiner*—Wayne Langel
(74) *Attorney, Agent, or Firm*—Liell & McNeil

(57) ABSTRACT

Often NOx selective catalysts that use ammonia to reduce NOx within exhaust to a harmless gas require on-board storage of ammonia which can be hazardous and inconvenient. In order to generate ammonia in exhaust, the present disclosure increases a NOx concentration in exhaust from at least one combustion chamber, at least in part, by injecting fuel in a predetermined increased NOx generation sequence that includes a first injection during non-auto ignition conditions and a second injection during auto ignition conditions. At least a portion of the NOx is converted to ammonia by passing at least a portion of the exhaust with the increased NOx concentration over an ammonia-producing catalyst.

7 Claims, 5 Drawing Sheets

ON-BOARD AMMONIA GENERATION AND EXHAUST AFTER TREATMENT SYSTEM USING SAME

U.S. GOVERNMENT RIGHTS

This disclosure was made with government support under the terms of Contract No. DE-FC05-97OR22605 awarded by the Department of Energy. The government may have certain rights in this invention.

TECHNICAL FIELD

The present disclosure relates generally to exhaust after-treatment systems with on-board ammonia generation, and more specifically to increasing NOx concentrations via combustion for generating ammonia used with an exhaust after-treatment systems.

BACKGROUND

In order to meet increasingly stringent federal regulations of NOx and other undesirable emissions, engineers are constantly seeking new strategies of reducing the production of undesirable emissions. One method of reducing NOx emissions is NOx selective catalytic reduction (SCR) systems. These systems use ammonia ($NH_3$) to reduce NOx to nitrogen ($N_2$) and water. Although these systems can reduce NOx emissions, NOx selective catalytic reduction systems often require an ammonia storage on the vehicle. Ammonia tanks can consume valuable space within an engine system and must be replenished periodically. Further, because of the high reactivity of ammonia, on-board storage of the ammonia can be hazardous.

Some of the drawbacks associated with the use of NOx selective catalysts can be eliminated by the use of on-board ammonia generation systems. For instance, the on-board ammonia production system set forth in U.S. Pat. No. 6,047, 542, issued to Kinugasa on Apr. 11 2000, injects an increased amount of fuel into one cylinder group within a plurality of cylinders in order to create a rich exhaust from the one cylinder group. The rich exhaust is then passed over an ammonia-producing catalyst that converts a portion of the NOx in the rich exhaust into ammonia. It has been found that the efficiency of conversion of NOx to ammonia by the ammonia-producing catalyst may be improved under rich conditions. The exhaust and the ammonia is then combined with the exhaust from a second cylinder group and passed through a NOx selective catalyst where the ammonia reacts with NOx to produce nitrogen gas and water.

Although the Kinugasa method allows for on-board generation of ammonia, the amount of ammonia that can be created is limited. It has been found that amount of ammonia produced is dependent on the amount of NOx in the exhaust being passed over the ammonia-producing catalyst. Because current combustion strategies can only produce a limited amount of NOx, the amount of ammonia created is also limited. Thus, in order to produce a sufficient amount of ammonia, a relatively significant percentage of the exhaust must be made rich and passed over the ammonia-producing catalyst, thereby resulting in a significant fuel penalty.

The present disclosure is directed at overcoming one or more of the problems set forth above.

SUMMARY OF THE INVENTION

In one aspect of the present disclosure, ammonia is generated in exhaust. A NOx concentration in the exhaust from at least one combustion chamber is increased, at least in part, by injecting fuel in a predetermined increased NOx generation sequence that includes at least a first injection during non-auto ignition conditions and a second injection during auto-ignition conditions within the combustion chamber. At least a portion of the NOx is converted to ammonia by passing the portion of the exhaust with the increased NOx concentration over an ammonia-producing catalyst.

In another aspect of the present disclosure, an exhaust after treatment system includes at least one combustion chamber that includes a piston operable to reciprocate within the combustion chamber. An ammonia producing catalyst is positioned in a first section of an exhaust passage that is fluidly connected to the combustion chamber. A NOx selective catalyst is positioned in a second section of the exhaust passage that is fluidly connected to the first section and is downstream from the ammonia producing catalyst. At least one fuel injector is operable to inject fuel into the combustion chamber and is in communication with an electronic control module. The electronic control module includes an increased NOx generation algorithm that is operable to signal the fuel injector to inject fuel in a predetermined increased NOx generation sequence that includes a first fuel injection during non-auto ignition conditions and a second fuel injection during auto ignition conditions within the combustion chamber.

In yet another aspect of the present disclosure, an article includes a computer readable data storage medium on which an increased NOx generation algorithm is stored. The increased NOx generation algorithm is operable to signal at least one fuel injector to inject fuel in a predetermined increased NOx injection sequence that includes commanding a first injection at a timing during non-auto ignition conditions and a second injection during auto-ignition conditions in a combustion chamber.

DETAILED DESCRIPTION

Figure 1:
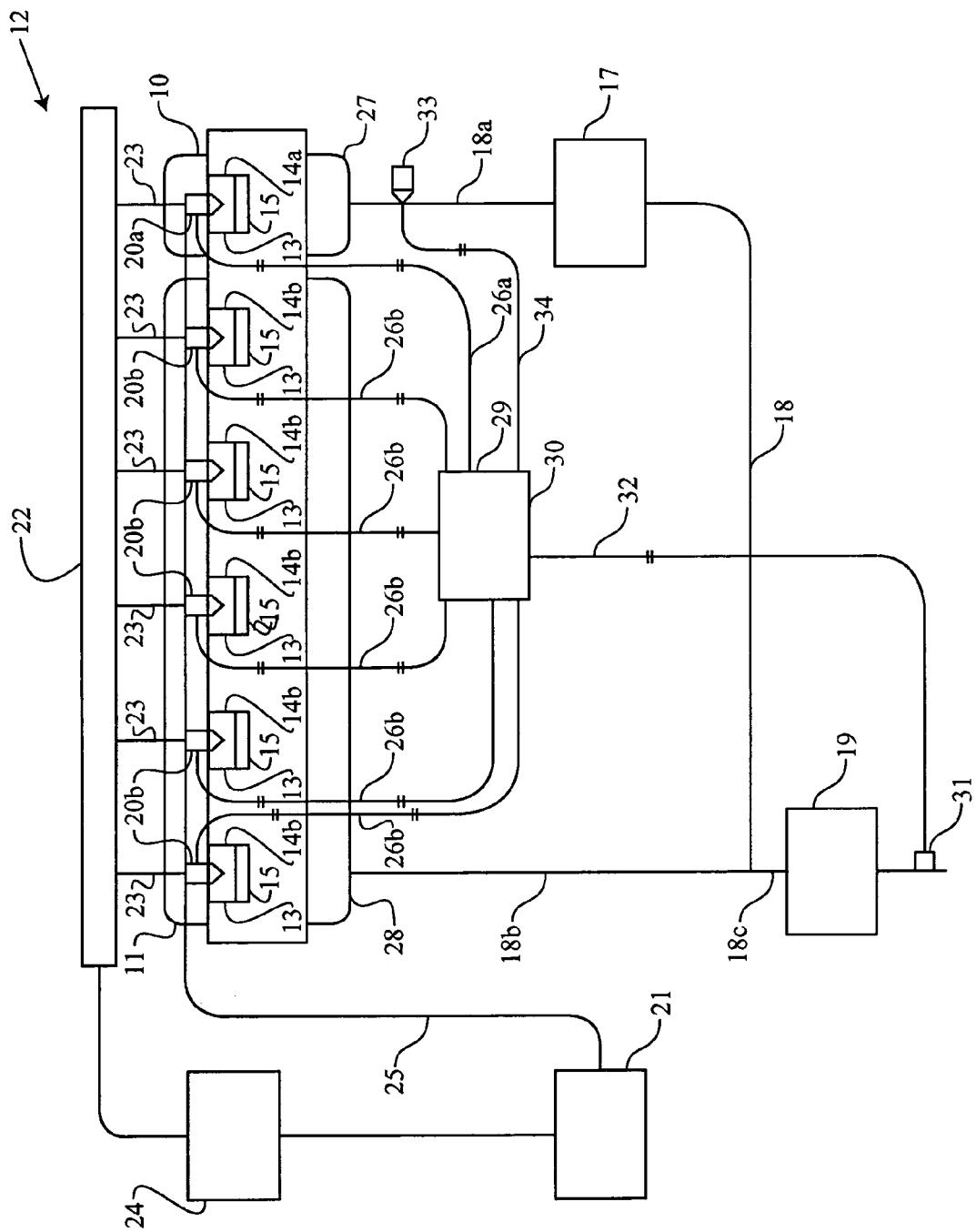
FIG. 1 is a schematic representation of an exhaust after-treatment system, according to the present disclosure.

Referring to FIG. 1, there is shown a schematic representation of an exhaust after-treatment system 12, according to the present disclosure. The exhaust after-treatment system 12 includes at least one combustion chamber 14 defined by an engine cylinder 13. Although the present disclosure contemplates only one combustion chamber 14, the exhaust after-treatment system 12 preferably includes a plurality of combustion chambers 14 divided into a first portion of combustion chambers 14a and a second portion of combustion chambers 14b. In the illustrated embodiment, the engine 10 includes six cylinders 13 defining the six combustion chambers 14 with one combustion chamber within the first portion 14a and five combustion chambers within the second portion 14b. For purposes of this discussion, the combustion chamber within the first portion 14a will be referred to as the first combustion chamber 14a. Those skilled in the art will appreciate that the number of combustion chambers 14 in the first portion 14a and the second portion 14b can be selected based on a desired power output to be produced by an engine included within the exhaust after-treatment system 12, or other factors known in the art. A piston 15 is positioned within each combustion chamber 14 and operable to reciprocate within each chamber 14.

The first combustion chamber 14a is in fluid communication with a first air intake manifold 10, and the second portion 14b of combustion chambers 14 are in fluid communication with a second air intake manifold 11. Although the present disclosure contemplates only one air intake manifold, by separating the air-intake manifolds, the air intake for each portions of the combustion chambers 14a and 14b can be controlled separately. Although the present disclosure is illustrated as including naturally-aspirated combustion chambers, those skilled in the art will appreciate that the first portion and/or the second portion of the combustion chambers could be fluidly connected to a forced-induction system including turbochargers and/or superchargers. The forced induction system could increase power output and/or control the air to fuel-vapor ratios within the combustion chambers. Similarly, the power output of each combustion chamber could be controlled by other means, including but not limited to, an air-intake throttle valve. Preferably, the conditions in the first combustion chambers 14a is lean relative to the second combustion chambers 14b.

The first combustion chamber 14a is preferably fluidly connected to a first exhaust manifold 27, and the second portion 14b of combustion chambers 14 are fluidly connected to a second exhaust manifold 28. The first exhaust manifold 27 is fluidly connected to a first section 18a of an exhaust passage 18, and the second exhaust manifold 28 is fluidly connected to a second section 18b of the exhaust passage 18.

An ammonia producing catalyst 17 is positioned within the first section 18a of the exhaust passage 18. The ammonia producing catalyst 17 is operable to convert NOx in at least a portion of the exhaust-gas stream from the first combustion chamber 14a into ammonia. The ammonia may be produced by a reaction between NOx and other substances in the exhaust-gas stream from the first combustion chamber 14a. For example, NOx may react with a variety of other combustion byproducts to produce ammonia. These other combustion byproducts may include, for example, $H_2$ (hydrogen gas), $C_3H_6$ (propane), or CO (carbon monoxide).

The ammonia-producing catalyst 17 may be made from a variety of materials. In one embodiment, ammonia-producing catalyst 17 may include at least one of platinum, palladium, rhodium, iridium, copper, chrome, vanadium, titanium, iron, or cesium. Combinations of these materials may be used, and the catalyst material may be chosen based on the type of fuel used, the air to fuel-vapor ratio desired, or for conformity with environmental standards, or based upon other considerations known in the art.

Downstream from the ammonia-producing catalyst 17, the first section 18a of the exhaust passage 18 fluidly connects with the second section 18b of the exhaust passage 18 to form a merged portion 18c of the second section 18b of the exhaust passage 18. A NOx selective catalyst 19 is positioned in the merged portion 18c of the exhaust passage 18 such that combined exhaust from the first combustion chamber 14a, the ammonia and the exhaust from the second combustion chambers 14b pass over the NOx selective catalyst 19. The NOx selective catalyst 19 facilitates a reaction between ammonia and NOx to at least partially remove NOx from the exhaust-gas stream in the merged portion 18c of the second section 18b. For example, the NOx selective catalyst 19 may facilitate a reaction between ammonia and NOx to produce nitrogen gas and water, among other reaction products.

It should be appreciated that a variety of additional catalysts and/or filters may be included in the exhaust passage 18, including, but not limited to, particulate filters, NOx traps, and/or three-way catalysts. For instance, in the illustrated embodiment, an oxidation catalyst can be positioned within the second section 18b upstream from the NOx selective catalyst 19. Because the NOx selective catalyst 19 may function more effectively with a ratio of $NO:NO_2$ of about 1:1, the oxidation catalyst may be operable to control a ratio of $NO:NO_2$ in the second section 18b of the exhaust passage 18.

A plurality of fuel injectors 20 are operable to inject fuel directly into the combustion chambers 14, and are separated into a first portion 20a associated with the first combustion chambers 14a and a second portion 20b associated with the second portion of combustion chambers 14b. However, non-direct injection for at the first chambers 14a is contemplated. Fuel is delivered from a fuel tank 21 to a common rail 22 via at least one fuel pump 24 in any conventional manner. The fuel pump 24 is generally in communication with an electronic control module 30 that controls the pressure output of the pump 24, and hence the pressure in common rail 22, based on desired engine operation. The fuel is supplied from the common rail 22 to each fuel injector 20 via individual branch passages 23. Each fuel injector 20 may be fluidly connected to the fuel tank 21 via a return line 25 depending on its mode of operation and control. Thus, fuel not injected into the combustion chambers 14 can be re-circulated through the system. In the illustrated embodiment, an additional fuel injector 33 is positioned to inject fuel within the first section 18a of the exhaust passage 18 upstream from the ammonia-producing catalyst 17. With appropriately shaped cams, which may be different from each other, cam actuated fuel injectors could also or alternatively be utilized.

Each fuel injector 20 and 33 is in communication with an article 29 with a computer readable data storage medium via communication lines 26 and 34, respectively. The article 29 may be in communication with, or be a part of, the electronic control module 30. The first portion of fuel injectors 20a, herein referred to as the first fuel injector 20a, is in communication with the electronic control module 30 via a first fuel injector communication line 26a. Similarly, each fuel injector 20 within the second portion 20b is in communication with the electronic control module 30 via a second fuel injector communication line 26b. Thus, the injection strategies of each fuel injector 20 can be separately controlled by the electronic control module 30. A sensor 31, which is operable to sense NOx and/or ammonia, may be positioned downstream from the NOx selective catalyst 19 and is in communication with the electronic control module 30 via a sensor communication line 32. Those skilled in the art will appreciate that sensors, such as NOx sensor 31, are readily commercially-available. Other strategies for sensing or predicting NOx concentrations may be available.

Figure 2:
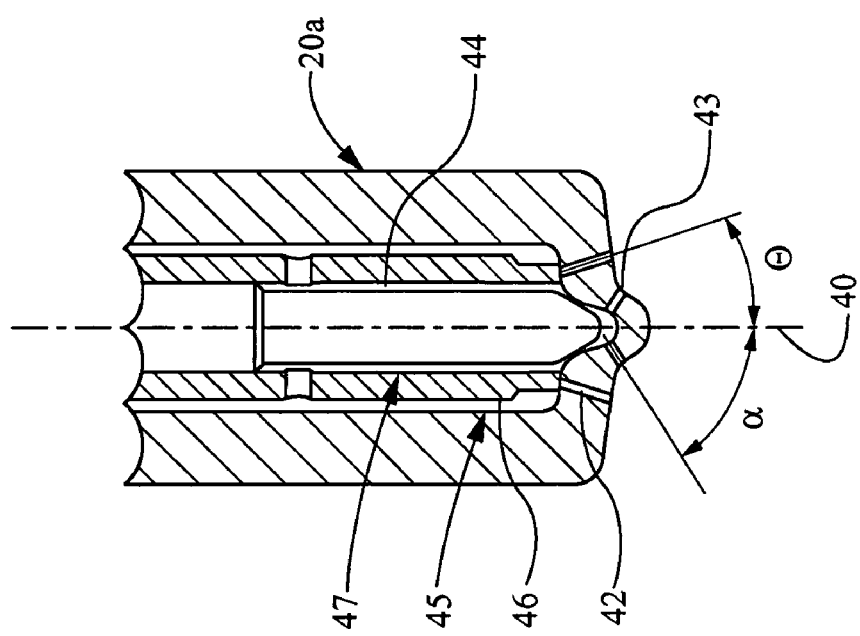
FIG. 2 is an enlarged sectioned side diagrammatic view of a tip portion of a fuel injector within the exhaust after-treatment system of FIG. 1.
Figure 4:
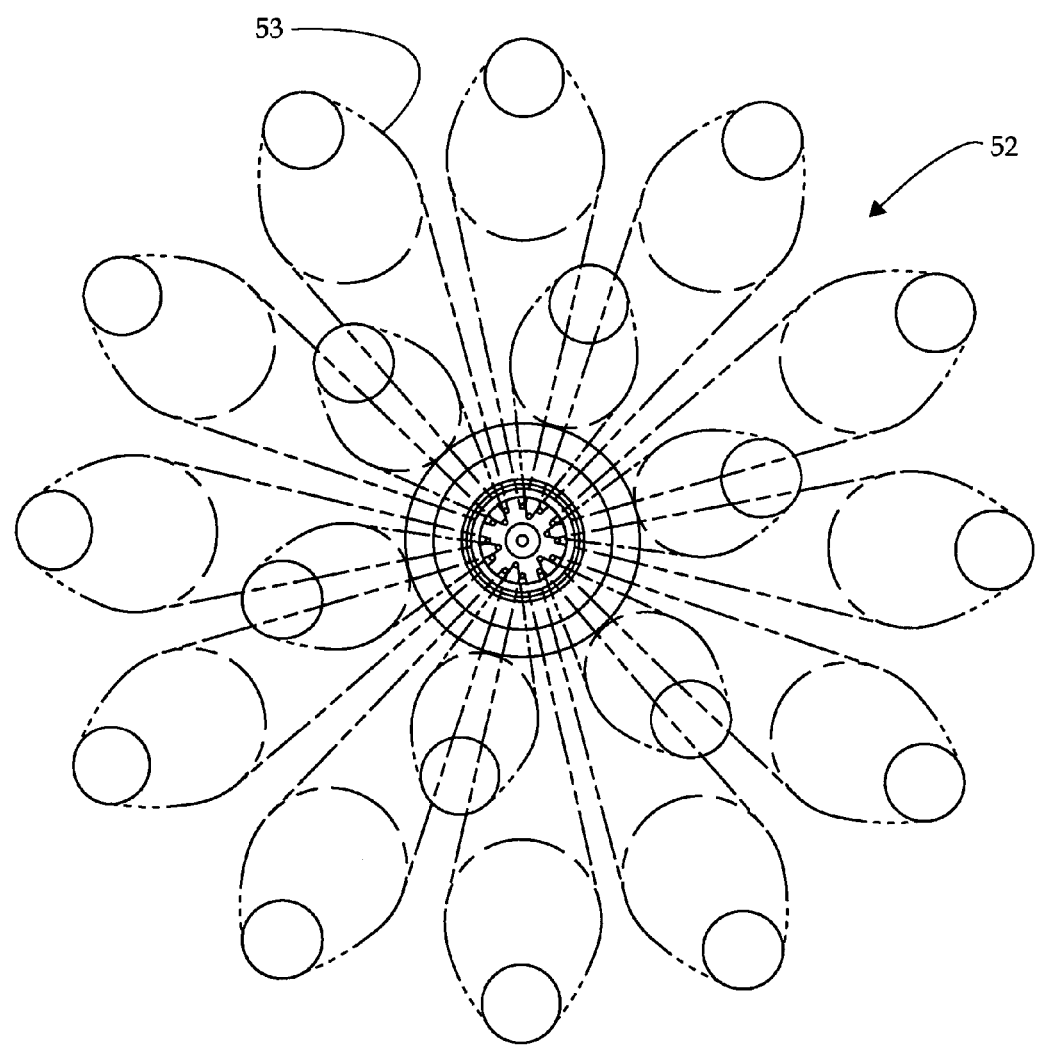
FIG. 4 is a bottom view of a first spray pattern from the fuel injector of FIG. 2.

Referring to FIG. 2, there is shown an enlarged sectioned side diagrammatic view of a tip portion of the fuel injector 20a of FIG. 1. Although any type of conventional fuel injector with only one set of nozzle outlets can be used, the fuel injector 20a may be a mixed-mode fuel injector that is operable to inject fuel in at least a first spray pattern (shown in FIG. 4) through a first nozzle outlet set 42 and a second spray pattern, which may be a conventional well known pattern, through a second nozzle outlet set 43. Although not necessary, fuel injectors 20b may also be mixed-mode fuel injectors. The first nozzle outlet set 42 is referred to as semi-homogeneous or homogenous charge nozzle outlet set and has a relatively small average angle theta with respect to the centerline 40. These outlets may be relatively small and arranged in a showerhead pattern as shown in FIG. 4. The second nozzle outlet set 43 is referred to as conventional nozzle outlet set typical of those in the art and has a relatively large average angle alpha with respect to centerline 40. These outlets are typically associated with fuel injections in the vicinity of piston top dead center as is known in the art. Thus, the first spray pattern, referred to as a homogeneous charge spray pattern, includes a relatively small average angle theta with respect to a centerline 40 of the combustion chamber 14a. The second spray pattern, referred to as a conventional spray pattern, includes a relatively large average angle alpha with respect to the centerline 40 of the combustion chamber 14a. The opening and closing of the second nozzle outlet set 43 and the first nozzle outlet set 42 may be controlled by an inner needle valve member 44 of a second direct control needle valve 47 and an outer needle valve member 46 of a first direct control needle valve 45, respectively. The fuel injector 20a has the ability to controllably inject fuel through the first nozzle outlet set 42, second nozzle outlet set 43, or both.

Figure 3:
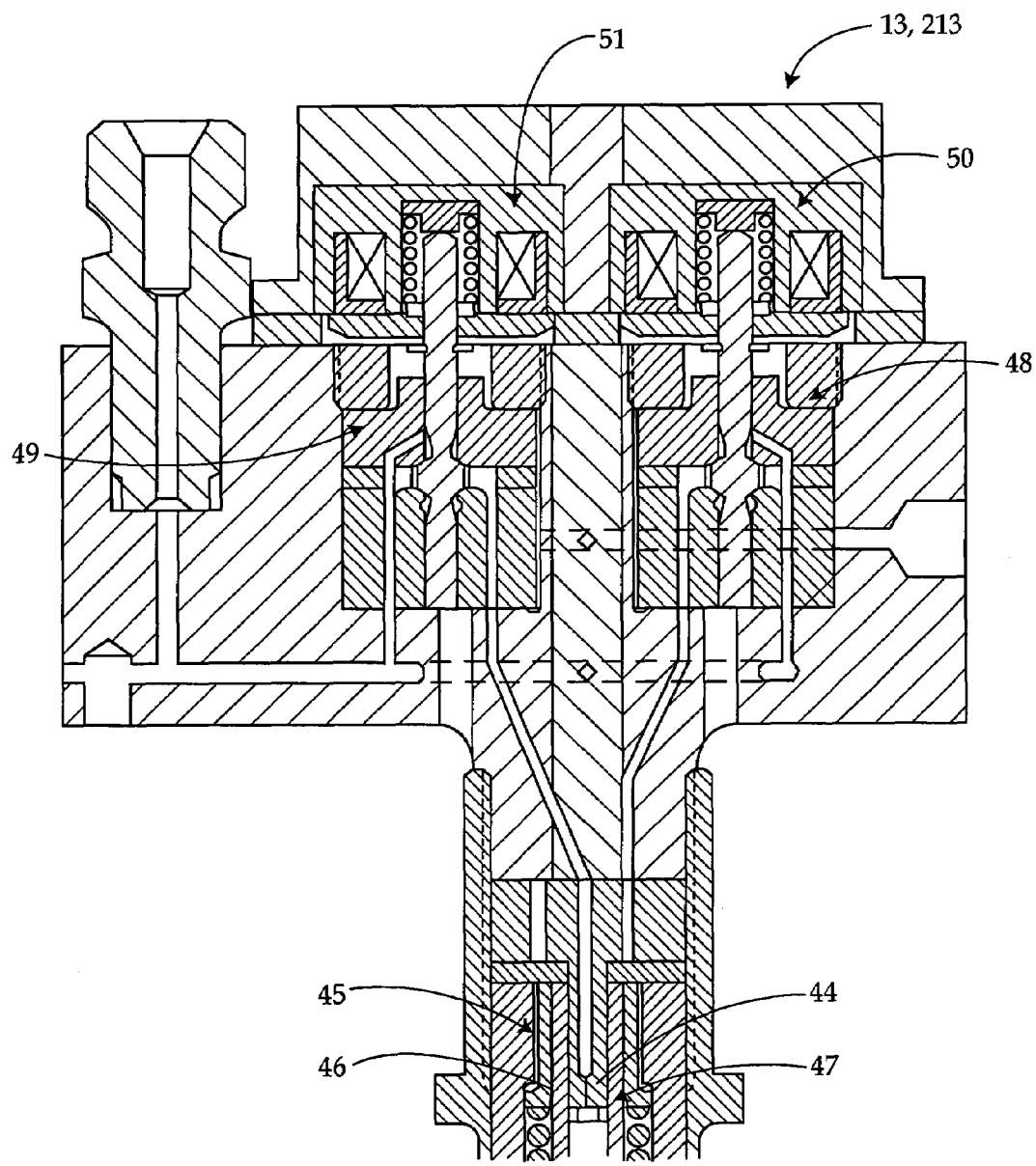
FIG. 3 is a sectioned side diagrammatic view of an upper portion of the fuel injector of FIG. 2.

Referring to FIG. 3, there is shown a sectioned side diagrammatic view of an upper portion of the fuel injector 20a of FIG. 2. A first and second needle control valves 48 and 49 control the positioning of the first and second direct control needle valves 45 and 47, respectively. Both needle control valves 48 and 49 operate in a similar manner and are preferably three way valves that are substantially identical in structure. The first and second needle control valves 48 and 49 are operably coupled to a first and second electrical actuators 50 and 51, respectively. In order to open the first nozzle outlet set 42, the first electrical actuator 50 is energized, and the first needle control valve 48 moves to a position that relieves pressure acting a closing hydraulic surface of the outer needle valve member 46. The outer needle valve member 46 can be lifted off its seat by high pressure fuel within the injector 20a, and the fuel can be injected through the first nozzle outlet set 42. Similarly, in order to open the second nozzle outlet set 43, the second electrical actuator 51 is energized, moving the second needle control valve 49 to a position that relieves pressure acting on a closing hydraulic surface of the inner needle valve member 44. The inner needle valve member 44 can be lifted off its seat by high pressure fuel within the injector 20a and inject the fuel through the second nozzle outlet set 43. Both the first and second electrical actuators 50 and 51 can be activated in various timings, including simultaneously, to inject fuel in different sequences and spray patterns. It should be appreciated that any fuel injector with the ability to inject fuel in more than one spray pattern may be considered mixed-mode injector for use within the present disclosure regardless of the means for controlling the opening and closing of the different nozzle outlet sets.

Referring to FIG. 4, there is shown an example first spray pattern 52. The first spray pattern 52 is illustrated to include 18 nonintersecting plumes 53 that are directed downward with an average angle theta, as shown in FIG. 2. Average angle theta is preferably substantially small compared to the average angle alpha of second spray pattern injected through the conventional nozzle outlet set 43. Generally, the engine piston 15 is farther away from top dead center during non-auto ignition conditions than during auto-ignition conditions. Thus, in order to avoid spraying the walls of the cylinder 16 and the piston 15 during non-auto ignition conditions, fuel can be injected in the first spray pattern 52 with the relatively small average angle with respect to the centerline 40 of the combustion chamber 14. If fuel is being injected in a conventional manner in auto-ignition conditions when the piston is nearer top dead center, fuel can be injected in the conventional second spray pattern with the relatively large average angle with respect to the centerline 40.

Figure 5:
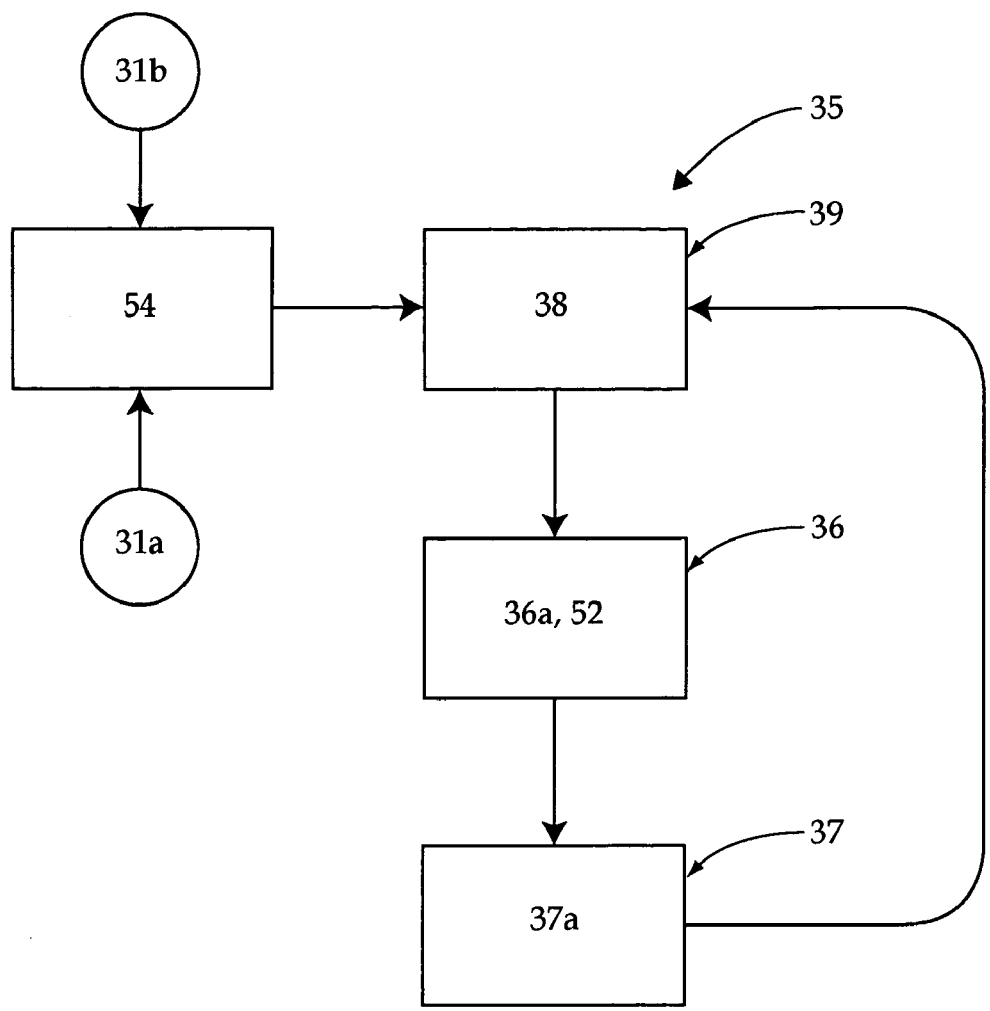
FIG. 5 is a flow chart of an increased NOx generation algorithm within an electronic control module of FIG. 1.

Referring to FIG. 5, there is shown a flow chart of an increased NOx generation algorithm 35 within the electronic control module 30 of FIG. 1. The increased NOx generation algorithm 35 is operable to signal the first fuel injector 20a to inject fuel in a predetermined increased NOx generation sequence. The predetermined increased NOx generation sequence includes at least a first fuel injection 36a during non-auto ignition conditions within the combustion chamber 14a followed by at least a second fuel injection 37a during auto-ignition conditions within the chamber 14a. It should be appreciated that the predetermined increased NOx generation sequence could include additional early or late injections. Those skilled in the art will also appreciate that auto-ignition conditions within the combustion chamber 14a generally occur when the engine piston 15 relatively close to top dead center of a compression or expansion stroke, and non-auto ignition conditions generally occur when the engine piston 15 is relatively far from top dead center of the compression or expansion stroke. Thus, the first fuel injection 36a will mix with air within the combustion chamber 14a as the engine piston 15 advances before igniting. The second injection 37a will ignite upon injection during combustion of the first injection 36a. Although the increased NOx generation algorithm 35 is only in communication with only the first fuel injector 20a, the present disclosure contemplates the increased NOx generation algorithm being operable to signal any number of the fuel injectors, including all of the fuel injectors within the plurality 20.

The increased NOx generation algorithm 35 preferably includes a setting algorithm 39 operable to set a NOx production amount 38 to correspond to an ammonia production amount. The NOx production amount 38 is the amount of NOx being produced from the first combustion chamber 14a. The ammonia production amount is the amount of ammonia needed to convert an expected NOx concentration 54 in the second section 18b of the exhaust passage 18 to harmless gasses. The increased NOx generation algorithm 35 will set the timing and the amounts of the first and second injections 36a and 37a to generate the NOx production amount 38. Those skilled in the art will appreciate that the NOx production amount 38 can be adjusted by adjusting at least one of the timing of the first injection 36a, the amount of the first injection 36a, the timing of the second injection 37a and the amount of the second injection 37a. Those skilled in the art will appreciate that the NOx production amount 38 to the ammonia production amount within the first section 18a of the exhaust passage 18 is about 1:1.

The expected NOx concentration 54 from the second group of combustion chambers 14b will change based on engine operating conditions. The present disclosure contemplates the determination of the expected NOx concentration 54 by various conventional open or closed loop means. In the illustrated embodiment, the electronic control module 30 includes a map with predetermined expected NOx concentrations based on engine operating conditions, such as engine speed and load. For each predetermined expected NOx concentration, there is a corresponding NOx production amount and predetermined timing and amounts of the first and second injections into combustion chamber(s) 14a. In addition, the NOx sensor 31 is positioned within the merged portion 18c of the exhaust passage to communicate the NOx concentration 31a and the ammonia concentration 31b to the electronic control module 30. The setting algorithm 39 may adjust the NOx production amount 38 such that the NOx and/or ammonia concentration 31a and 31b downstream from the NOx selective catalyst 19 is at or below a predetermined NOx and ammonia concentration amount. It should also be appreciated that the NOx being produced within the second portion of combustion chambers 14b could be increased in order to match the ammonia production rather than the ammonia production being reduced. Those skilled in the art will appreciate that the different injection strategies between the first fuel injector 13a and the second portion of fuel injectors 20b may create different power outputs for the combustion chambers in the first portion 14a and in the second portion 14b. Engine vibrations caused by the possible varying power outputs can be reduced by matching stroke cycles of one or more cylinders 13 in order to cause the cylinders to function as one cylinder, or other strategies known in the art.

The increased NOx generation algorithm 35 includes a first spray pattern algorithm 36 operable to signal the first fuel injector 20a to inject the first injection 36a in the first spray pattern 52 illustrated in FIG. 4. Because the first injection 36a occurs during non-auto ignition conditions within the combustion chamber 14a, the relatively small angle of the injection will allow the fuel to be injected within the open space of the combustion chamber 14a rather than the on the walls of the cylinder 13. The increased NOx generation algorithm 35 also includes a second spray pattern algorithm 37 operable to signal the first fuel injector 20a to inject the second injection 37a in the second spray pattern, being the conventional spray pattern. Because the second injection 37a occurs during auto-ignition conditions, the second injection 37a will ignite upon injection. Thus, the first charge will inherently have ignited before the second injection occurs. Thus, the second injection 37a can be injected at a relatively large angle with respect to the centerline 40 as compared with the first injection 36a.

INDUSTRIAL APPLICABILITY

Referring to FIGS. 1-5, a method of generating ammonia in exhaust will be discussed. Although the present disclosure will be discussed for the exhaust after treatment system 12 for a six-cylinder diesel engine, it should be appreciated that method of generating ammonia could be used within any exhaust after treatment system for a power source. This disclosure may also be applicable to engines that include spark ignition in at least some combustion chambers.

In order to generate ammonia in exhaust, a NOx concentration within the exhaust from the first combustion chamber 14a is increased, at least in part, by injecting fuel in the predetermined increased NOx generation sequence. Although the predetermined increased NOx generation sequence is illustrated as including only the first injection 36a during non-auto ignition conditions and the second injection 37a during auto-ignition conditions, it should be appreciated that additional early or late injections could be added to the sequence. Although the amount of fuel injected can vary, preferably the predetermined increased NOx generation sequence will create a slightly lean exhaust. Those skilled in the art will appreciate that lean exhaust is exhaust with lambda less than one. Lambda is the air-to-fuel ratio divided by stoichiometric air-to-fuel ratio.

The setting algorithm 39 of the increased NOx generation algorithm determines the amount and injection timing of the first and second injections 36a and 37a necessary to create the desired NOx production amount 38. The setting algorithm 39 is operable to set the NOx production amount 38 from the first combustion chamber 14a to correspond to the ammonia production amount necessary to reduce the expected NOx concentration 54 created by the second group of combustion chambers 14b. Those skilled in the art will appreciate that the NOx production amount 38 can be set by either a closed or open loop system. In the illustrated embodiment, the expected NOx concentrations at various engine operating conditions are predetermined and included within a map in the electronic control module 30. Each predetermined expected NOx concentration will have a corresponding NOx production amount 38 from the first combustion chamber 14a. The map can include the predetermined amount and timing of each inject to achieve the NOx production amount 38 for the expected NOx concentration at the sensed engine operating conditions. These maps can be fine tuned on-board with appropriate sensing combined with a closed loop control algorithm.

In addition to the predetermined map, the NOx sensor 31 may be used to sense the NOx concentration 31 a and/or ammonia concentration 31 b within the exhaust downstream from the NOx selective catalyst 19. If the NOx concentration exceeds a predetermined NOx concentration, the setting algorithm 39 will determine that the there is insufficient ammonia to reduce all of the NOx within the merged portion 18c of the exhaust passage 18. The setting algorithm 39 can adjust the NOx production amount 38 from the first combustion chamber 14a to correspond to an increase ammonia production amount that is needed to reduce the expected NOx concentration 54. In order to increase the NOx production amount 38, those skilled in the art will appreciate that the timing and the amounts of the first and second injections within the predetermined increased NOx generation injection strategy can be adjusted. For instance, to increase the NOx production amount 38, while maintaining the slightly lean environment, the timing of the first injection 36a can be advanced and/or the amount of the first injection 36a can be increased.

If the NOx sensor 31 senses an ammonia concentration in the exhaust that exceeds a predetermined ammonia concentration, the setting algorithm 39 will determine that there is more ammonia being produced than necessary to reduce the expected NOx concentration 54. The setting algorithm 39 can reduce the NOx production amount 38 to correspond to a decreased ammonia production amount needed to reduce the expected NOx concentration 54. Those skilled in the art will appreciate that the NOx production amount 38 from the first combustion chamber 14a can be reduced by adjusting the timing and/or amounts of the first injection 36a and the second injection 37a of the predetermined increased NOx generation injection strategy. For instance, while maintaining the slightly lean environment, to reduce the NOx concentration, the timing of the second injection 37a can be retarded and/or the amount of the first injection 36a can be reduced. Although the present disclosure illustrates the NOx production amount 38 being based on the predetermined expected NOx concentration from the map and the sensed NOx and ammonia concentrations 31a and 31b, it should be appreciated that the NOx production amount could be determined based on solely the map or the sensed concentrations. Regardless of the procedure for setting the NOx production amount 38, the present disclosure can assure that the ammonia produced within the first section 18a of the exhaust passage 18 will reduce the NOx concentration within the second section 18b such that very little, if any, NOx and ammonia are present in the exhaust downstream from the NOx selective catalyst 19.

During each engine cycle, the first fuel injection 36a occurs during non-auto ignition conditions within the combustion chamber 14a. Preferably, the timing of the first injection 36a will be sufficiently early within the engine cycle to allow some mixing of the fuel with the air before ignition. Thus, the first injection 36a is referred to as a semi-homogeneous injection that creates a high NOx generating environment within the combustion chamber 14a. Although the timing of the injection can vary, the first injection 36a may occur generally at 80° before top dead center of the compression stroke in the preferred embodiment with the mixed-mode fuel injector 20a. Because the first injection 36a is preferably injected in the second spray pattern 52 shown in FIG. 4, the fuel will spray at a relatively small average angle with respect to the centerline 40 of the combustion chamber 14a, thereby reducing the risk of spraying the walls of the cylinder 13 and the piston 15. However, with the conventional fuel injector, the fuel will be injected in the conventional spray pattern with the relatively large angle with respect to the centerline 40. In order to avoid spraying the walls of the cylinder 13 and the piston 15, the first injection 36a from the conventional fuel injector will occur generally between 46-60° before top dead center of the compression stroke. Thus, with the mixed-mode injection the first injection 36a can occur earlier than with a conventional injector without diluting engine lubricating oil due to wall wetting, allowing more time for the fuel within the first injection to mix with the air in the cylinder 16. Regardless of whether a conventional or the preferred mixed-mode fuel injection 20a is used, because the first injection 36a occurs during non-auto ignition conditions, the fuel within the combustion chamber 14a will have time to partially mix with the air prior to ignition.

As the engine piston 15 advances during the compression stroke, the fuel from the first fuel injection 36a will combust. Generally, the first fuel injection 36a will combust around 20-25° before top dead center of the compression stroke. Preferably during combustion of the first fuel injection 36a, the second spray pattern algorithm 37 of the increased NOx generating algorithm 35 will signal the fuel injector 20a to inject in the second spray pattern, being the conventional spray pattern. The second electrical actuator 51 will be activated, thereby lifting the inner direct needle valve member 44 off of its seat and opening the conventional nozzle outlet set 43. Regardless of whether the fuel injector is the preferred mixed mode injector 20a or a conventional injector, the fuel will be injected at a relatively small angle with respect to the centerline 40 of the combustion chamber 14a. It has been found that the combination of the semi-homogeneous first injection 36a followed by the conventional second injection 37a creates a greater NOx concentration within the exhaust than either of the first or second injections alone.

As the engine piston 15 retracts during an expansion stroke and/or advances during an exhaust stroke, the combustion chamber 14a will return to a non-combustible environment. In the illustrated embodiment, the electronic control module 30 preferably will signal the fuel injector 20a to inject an additional amount of fuel in the non-combustible environment during at least one of the expansion stroke and an exhaust stroke. Those skilled in the art will appreciate that the engine piston 15 will be at a relatively substantial distance from top dead center of the compression stroke when the combustion chamber 14a is in the non-combustible environment. Thus, the fuel injector 20a may inject the fuel in the first spray pattern 52, thus avoiding spraying the piston and cylinder walls. On the other hand, if cylinder conditions are relatively hot, as expected, the additional fuel may be sprayed in a conventional spray pattern and vaporized before any wall wetting could occur. Thus, this might facilitate allowing the entire invention be practiced with a fuel injector having only one set of spray holes arranged in a conventional spray pattern. The advancing piston 15 during the exhaust stroke will push the exhaust with the increased NOx concentration and the additional unburnt fuel amount out of the combustion chamber 14a and into the first exhaust manifold 27 via an open exhaust valve. This unburnt fuel can create the rich exhaust conditions desirable for NOx to ammonia conversion without the need for the additional fuel injector 33 within the exhaust passage. However, in the embodiment illustrated in FIG. 1, unburnt fuel is added to the exhaust by injecting the fuel into the first section 18a of the exhaust passage 18 downstream from the combustion chamber 14a. The electronic control module 30 can signal the additional fuel injector 33 to inject the additional amount of fuel in order to create the rich conditions desirable for NOx to ammonia conversion over the ammonia-producing catalyst 17. It should be appreciated that the rich exhaust conditions can be created by other methods, such as injecting more fuel within the predetermined increased NOx generation sequence. Although the predetermined increased NOx generation sequence can create rich conditions within the exhaust from the first combustion chamber 14a, preferably the predetermined increased NOx generation sequence creates a slightly lean exhaust.

The increased NOx within the exhaust from the first combustion chamber 14a is converted to ammonia, at least in part, by passing the portion of the exhaust with the increased NOx concentration over the ammonia-producing catalyst 17. In the rich conditions created by the additional amount of unburnt fuel, the NOx to ammonia conversion within the first section 18a of the exhaust passage 18 is approximately 1:1.

Other exhaust different from the exhaust with the ammonia is created from the second portion of combustion chambers 14b and flows through the second exhaust manifold 28 to the second section 18b of the exhaust passage 18. Because more control over timing and amount strategies are available with mixed mode injectors, preferably the second portion of fuel injectors 20b are mixed-mode injectors. The exhaust from the second section 18b is mixed with the ammonia in a merged portion 18c of the second section 18b of the exhaust passage 18. The combined exhaust and ammonia is passed over the NOx selective catalyst 19 within the merged portion 18c. Those skilled in the art will appreciate that the NOx selective catalyst 19 uses the ammonia to reduce the NOx to harmless gases, such as nitrogen, that are emitted in the exhaust.

The present disclosure is advantageous because it reduces the fuel penalty associated with the on-board ammonia generation systems. Because more NOx can be produced from the predetermined increased NOx generation strategy, only one combustion chamber 14a may be needed to provide sufficient NOx for conversion to ammonia operable to reduce the expected NOx concentration 54 from the second portion of combustion chambers 14b. Because only a small percentage of the exhaust stream is needed to create the desired NOx concentration, less fuel is needed to create rich conditions required for ammonia production over the ammonia-producing catalyst 17. The reduced fuel penalty conserves fuel and reduces the cost of the exhaust after-treatment system 12.

Moreover, the addition of the second injection 37a during auto-ignition conditions not only creates increased NOx concentrations, but also reduces a cylinder pressure spike that can be associated with the early first fuel injections. By injecting the second injection 37a during combustion of the first injection 36a, any pressure spike within the combustion chamber 14a will be reduced, thereby lessening the wear on the components within the cylinder 16. Further, the ability to inject fuel from the mix-mode fuel injector 20a in the first spray pattern 54 decreases the risk of fuel-in-oil dilution that can be caused by spraying the cylinder walls with fuel during early injections. Thus, the use of the mixed-mode injector 20a and the multi-shot injection strategy can increase the life of the engine components.

It should be understood that the above description is intended for illustrative purposes only, and is not intended to limit the scope of the present invention in any way. Thus, those skilled in the art will appreciate that other aspects, objects, and advantages of the invention can be obtained from a study of the drawings, the disclosure and the appended claims.

What is claimed is:

1. A method of generating ammonia in exhaust comprising the steps of:
    increasing a NOx concentration in exhaust from at least one combustion chamber, at least in part, by injecting fuel in a predetermined increased NOx generation sequence including at least a first injection during non-auto ignition conditions and a second injection during auto-ignition conditions, and igniting the fuel in the combustion chamber; and
    converting at least a portion of the NOx to ammonia, at least in part, by passing at least a portion of the exhaust with the increased NOx concentration in proximity of an ammonia-producing catalyst.

2. The method of claim 1 wherein the step of increasing NOx includes a step of injecting the first injection in a first spray pattern with a small average angle relative to a centerline of the combustion chamber and injecting the second injection in a second spray pattern with a large average angle relative to the centerline of the combustion chamber.

3. The method of claim 1 including a step of adding unburnt fuel into the exhaust, at least in part, by injecting an additional amount of fuel into a non-combustible environment of the combustion chamber during at least one member selected from the group consisting of an expansion stroke and exhaust stroke.

4. The method of claim 1 including a step of adding unburnt fuel into the exhaust, at least in part, by injecting fuel into the exhaust passage downstream from the combustion chamber.

5. The method of claim 1 including the steps of:
    mixing the ammonia with other exhaust; and
    passing the ammonia and other exhaust over a NOx selective catalyst.

6. The method of claim 5 including a step of setting an ammonia production amount to reduce an expected NOx concentration from the other exhaust.

7. The method of claim 6 wherein the step of increasing NOx includes a step of injecting the first injection in a first spray pattern including a small average angle relative to a centerline of the combustion chamber and injecting the second injection in a second spray patter includes a large average angle relative to the centerline of the combustion chamber; and
    adding unburnt fuel into the exhaust, at least in part, by injecting fuel into the exhaust passage upstream from the ammonia-producing catalyst or injecting an additional amount of fuel into a non-combustible environment of the combustion chamber during at least one member selected from the group consisting of an expansion stroke and exhaust stroke.

* * * * *